US007690091B2

(12) United States Patent
Stobbe

(10) Patent No.: US 7,690,091 B2
(45) Date of Patent: Apr. 6, 2010

(54) LOOP CLOSURE

(75) Inventor: Anatoli Stobbe, Barsinghausen (DE)

(73) Assignee: ASTRA Gesellschaft für Asset Management mbH Co. KG, Baringhausen (DE)

(*) Notice: Subject to any disclaimer, the term of this patent is extended or adjusted under 35 U.S.C. 154(b) by 108 days.

(21) Appl. No.: 11/598,389

(22) Filed: Nov. 13, 2006

(65) Prior Publication Data

US 2007/0107175 A1 May 17, 2007

(30) Foreign Application Priority Data

Nov. 15, 2005 (DE) ...................... 10 2005 054 787

(51) Int. Cl.
*F16B 21/00* (2006.01)
*A45F 5/00* (2006.01)

(52) U.S. Cl. ...................... 24/704.1; 70/456 R; 70/457; 70/459

(58) Field of Classification Search ...................... None
See application file for complete search history.

(56) References Cited

U.S. PATENT DOCUMENTS 1,571,425 A * 2/1926 Mataloni ..................... 70/459
1,977,301 A * 10/1934 Bradford ..................... 292/325
4,091,646 A * 5/1978 Sugimoto ................. 70/456 R
4,314,467 A * 2/1982 Arvan ....................... 70/456 R
5,400,625 A * 3/1995 Embry ....................... 70/38 A
5,820,176 A 10/1998 Leon et al.
5,916,283 A * 6/1999 Steinbach ................. 70/456 R
6,000,736 A 12/1999 Leon et al.
6,536,247 B2 * 3/2003 Huang ...................... 70/456 R

FOREIGN PATENT DOCUMENTS

| | | |
|---|---|---|
| DE | 698 08 819 | 7/2003 |
| DE | 699 18 823 | 8/2005 |
| EP | 0 861 994 | 9/1998 |
| EP | 1 074 011 | 2/2001 |

* cited by examiner

*Primary Examiner*—Robert J Sandy
(74) *Attorney, Agent, or Firm*—Collard & Roe, P.C.

(57) ABSTRACT

A loop closure includes a deformable loop and a closure with at least one entrance opening for at least one end of the loop which is fixed in the closure. The closure has a locking bolt opening with a locking bolt fixed once in the closure. By way of the locking bolt the end of the deformable loop is positively and/or non-positively fixed in the closure.

8 Claims, 3 Drawing Sheets

LOOP CLOSURE

Figure 1:
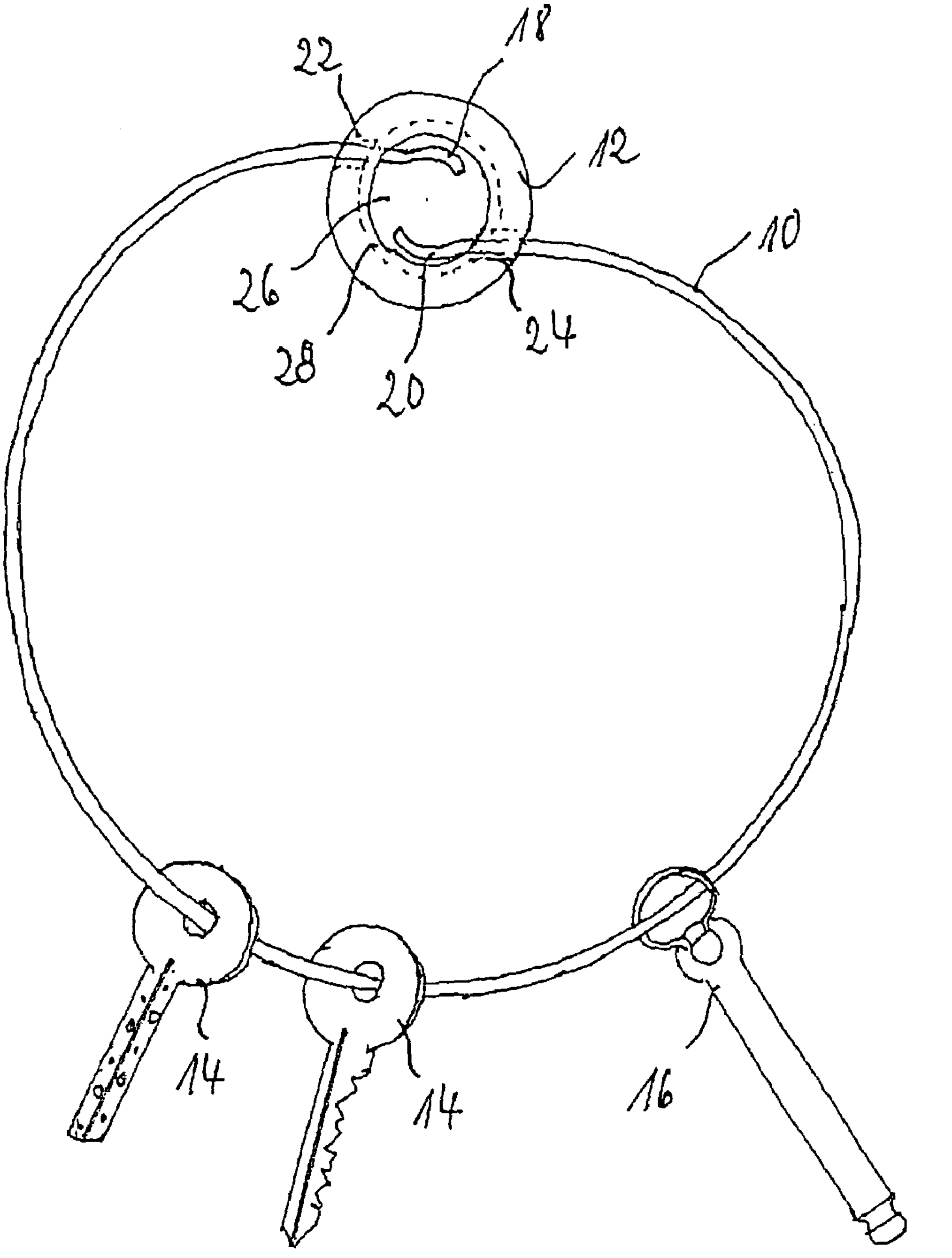

The invention relates to a loop closure in accordance with the introductory section of claim 1.

To secure or track valuable objects it is known to mechanically connect them to identification carriers. Such a connection can be made of a loop of cable, a chain or deformable solid material which passes through eyelets in the valuable object and which has ends that are fastened by a closure. The closure can be integrated into the identification carrier or can be separate if the loop also passes through an eyelet in the identification carrier.

A connection between valuable objects and identification carriers should be simple and also. when required, be separable again, but unauthorized temporary separation should be prevented or at least recognised as unauthorized manipulation.

The aim of the invention is to create a reusable loop closure which is easy to close, but can only be opened after the destruction of a low-value component that is replaced when the closure is closed again.

This is achieved in the case of a loop closure in accordance with the introductory section of claim 1 through the features of this claim.

Further developments and advantageous embodiments result from the sub-claims.

The loop closure in accordance with the invention comprises a deformable loop and a closure as high-value reusable components, and a locking bolt consisting of a low-value component that is only usable once. With the locking bolt at least one end of the loop is locked in the closure.

Therefore two variants of the connection between the loop and the closure are possible, namely a first variant in which one end of the loop is firmly connected to the closure and the other end can be locked in the closure by means of the locking bolt, and a second variant in which both ends of the loop can be locked in the closure by means of the locking bolt.

The loop can be designed as an elastically deformable ring, as a cable, a cord or a chain. Plastics, but preferably metal are suitable as materials.

The closing of the loop closure after connecting the valuable objects and the identification carrier by way of the loop passed through their eyelets is possible in that depending on the embodiment, one end or both ends of the loop are introduced into the closure and are locked with the locking bolt. However, the locking bolt can only be used once, i.e. it cannot be reversibly removed and reused. As the connection can only be properly opened by destroying the locking bolt and closed again by way of a new locking bolt, unauthorized manipulation is evident if no new locking bolt is present.

In accordance with a further embodiment the locking bolt can be fixed in the closure by way of a catch, snap, deformable, adhesive or melt connection.

These types of connection are simple to produce but cannot without permanent and therefore verifiable modification be temporarily opened and then closed again. Any manipulation is therefore obvious.

The locking bolt can also have multiple components.

By way of the multiple-component design the parts of the locking bolt can be connected to each other and be form-fitted to the closure body without the closure body itself having to exhibit particularly complex-to-produce shaping features or suffer impairment in the case of adhesive or melt connections. In this way the production and reuse of the closure body is facilitated.

The locking bolt or in the case of multiple-component versions, every part, can be exclusively marked.

In this way manipulations can be uncovered in that although a locking bolt registered via its exclusive marking is replaced with a new original locking bolt, the marking of the replacement locking bolt differs from the marking of the registered locking bolt.

Although a locking bolt registered via its exclusive marking can be replaced with a manufactured copy, apart from the basic shape of the locking bolts the marking would also have to be duplicated. This constitutes an additional hurdle and therefore makes manipulations considerably more difficult.

The marking can be engraved by laser beam.

In this way at high resolution four digit character and/or number combinations can be arranged to show exclusive markings on the smallest of spaces. Manipulations would require the same engraving technology and therefore great expense.

Preferably the end of the deformable loop is profiled and fixed in a counter-profile of the closure and/or locking bolt.

Through profiling a form-fitting and therefore not indestructibly separable connection of the end or the ends of the loop with the closure and/or locking bolt is achieved.

An example of embodiment of the invention is described below with the aid of a drawing.

In the drawing

Figure 2:
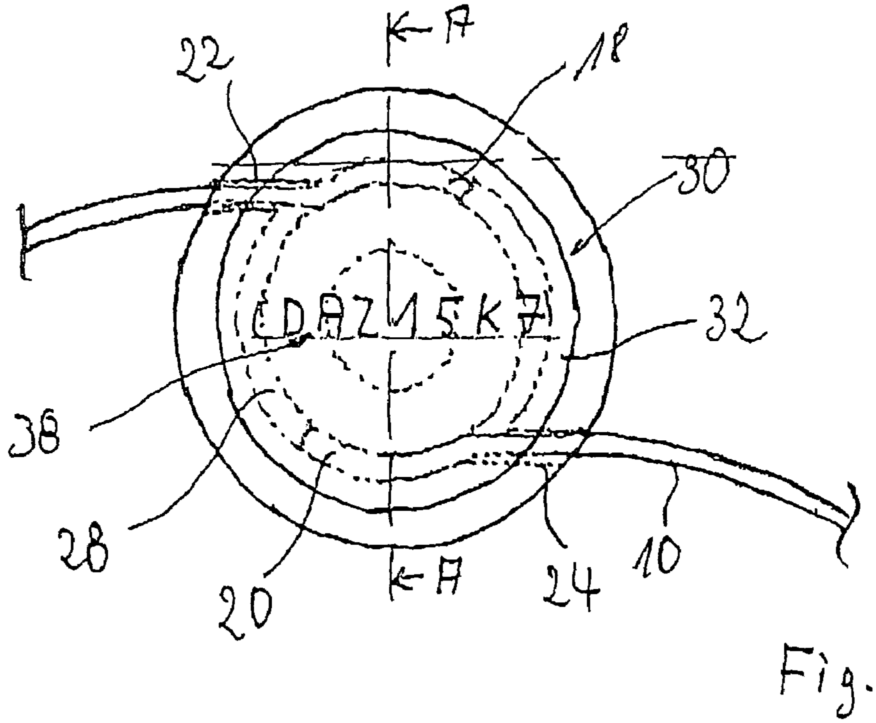
Figure 3:
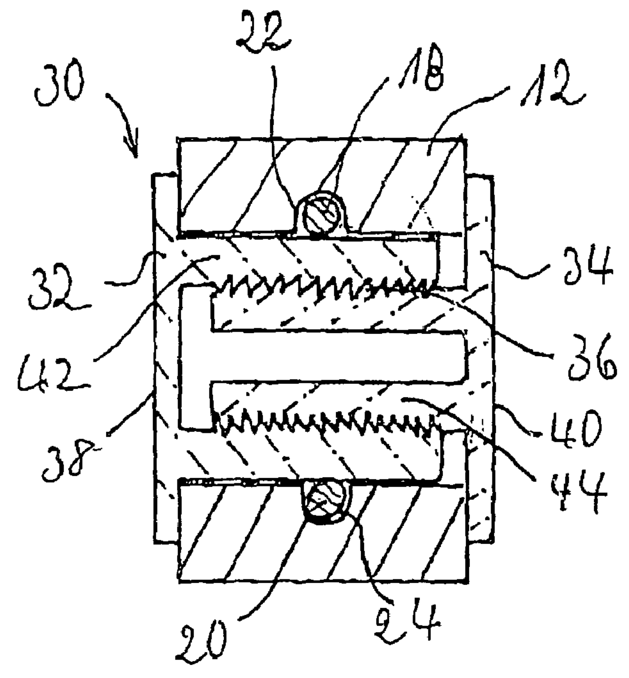
Figure 4:
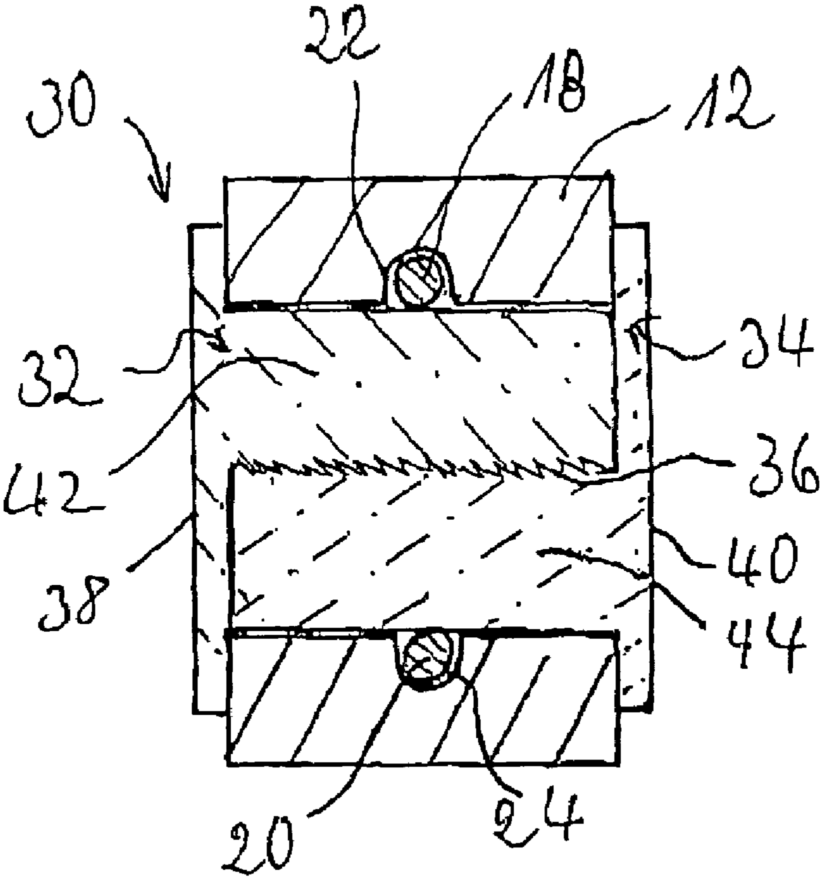

FIG. 1 shows a view of a loop with objects and a closure without a locking bolt FIG. 2 shows a partial view of a loop with a closure with a locking bolt FIG. 3 shows a cross-section through a closure with ends of a loop and a locking bolt, and FIG. 4 shows a cross-section through a closure with the ends of a loop and a locking bolt in accordance with an alternative embodiment FIG. 1 shows a view of a loop 10 with objects 14; an identification carrier 16 and a closure 12 without a locking bolt. A loop 10 wire cable passes through the eyelets of several valuable objects 14 and an identification carrier 16. Ends 18, 20 of the wire loop 10 are passed through radial openings 22, 24 of a ring-shaped closure 12 in a locking bolt opening 26 of the closure 12. The inner circumference of the closure 12 has a ring-shaped groove 28 or tangential groove areas. The ends 18, 20 of the loop 10 are each profiled in the form of an arc of a circle. The outer radius of the arcs corresponds to the tangential course of the annular groove 28 or the groove areas in the closure 12, so that the ends 18, 20 of the loop 10 can be in flush contact with the annual groove 28 or the groove areas in the closure 12 when they are radially expanded.

FIG. 2 shows a partial view of a loop 10 with a closure 12 with a locking bolt 30. The locking bolt 30 fills a locking bolt opening 26 of the closure 12 and thus forces the ends 18, 20 of the loop 10 into the annular groove 28 or the groove areas in the closure 12. Due to the profiling of the ends 18, 20 of the loop 10, the ends 18, 20 are locked in the closure 12 and can no longer be pulled out through the entrance openings 22, 24 of the closure 12 without being destroyed.

The locking bolt 30 itself is formed of two parts that can be fitted together. Each of the parts has a flange or head and a shaft and are introduced from both sides of the closure 12 into the locking bolt opening 26 and joined together. By doing so the shaft with the larger external diameter forces the ends 18, 20 of the loop 10 into the annular groove 28 or the groove areas. The other shaft with the smaller external diameter penetrates into a hollow area of the shaft with the larger diameter and forms an indestructible inseparable catch-type connection.

When the parts of the locking bolt 30 are joined, there is no possibility of lifting the catch connection without damage and separating the parts again. Rather, the catch connection has to be destroyed, which can be done by drilling or grinding it open with a tool with a diameter greater than the diameter of the catch connection. Reclosing the loop closure after forced opening therefore requires the use of a new locking bolt.

On both flanges or heads of the parts there are exclusive markings 38 so that on registering the original marking of a locking bolt 30 replacement of the locking blot with original parts with different markings also allows manipulations to be recognised.

FIG. 3 shows a cross-section through a closure 12 with the ends 18, 20 of a loop 10 and a locking blot 30 from parts 32, 34 to illustrate the catch connection. The parts 32, 34 each comprise a head 38, 40 and a shaft 43, 44. Catch projections, saw-shaped in longitudinal section, on the outside of the shaft 44 with the smaller external diameter engage in catch grooves, saw-shaped in longitudinal section, on the inside of the shaft 42 with the larger external diameter and form an irreversible catch connection 36 between the two parts of the locking bolt 30. On intersection of the parts 32, 34 of the locking bolt 30 the flanges or heads 38, 40 approach the face surfaces of the closure 12 until they are finally in contact therewith, whereby the closure is completely closed.

FIG. 4 shows a cross-section through a closure 12 with the ends 18. 20 of a loop 10 and a locking bolt 30 of an alternative embodiment of parts 32, 34. These have identical, axially longitudinally divided shaft halves which are saw-shaped on their flat sides and interlock after being pushed together forming a complete shaft. Both parts have the same markings, which have been produced by laser beam engraving. The advantage of this embodiment consists in the fact that only one shaping tool is required for its production.

The invention claimed is:

1. Loop closure comprising a deformable loop (10) and a closure (12) for holding in a locked manner at least one end (18) of the loop (10) wherein the closure (12) comprises a locking bolt opening (26) with a locking bolt (30) fastened once in the closure (12), through which the at least one end (18) of the deformable loop (10) can be locked positively and/or non-positively in the closure (12), wherein the end (18) of the deformable loop (10) is profiled and fixed in a counter-profile of the closure (12) when the locking bolt (30) fills the locking bolt opening (26) and forces the end (18) of the deformable loop (10) radially outwardly into the counter profile of the closure (12), thereby locking the end (18) of the deformable loop (10) in the closure such that the end (18) cannot be pulled out of the closure (12) without destroying the locking bolt (30).

2. Loop closure in accordance with claim 1 wherein one end of the deformable loop (10) is firmly connected to the closure (12) and the other end (18) of the deformable loop (10) can be inserted through an entrance opening (22) in the closure and locked there.

3. Loop closure in accordance with claim 1, wherein both ends (18, 20) of the deformable loop (10) can be inserted through entrance openings (22, 24) in the closure (12) and locked there.

4. Loop closure in accordance with claim 1, wherein the loop (10) is designed as an elastically deformable ring, as cable, as a cord or as a chain and is made of synthetic material and/or metal.

5. Loop closure in accordance with claim 1, wherein the locking bolt (30) is irreversibly fixed in the closure (12) by a catch, snap, deformable, adhesive or melt connection (36).

6. Loop closure in accordance with claim 1, wherein the locking bolt (30) comprises multiple parts (32, 34).

7. Loop closure in accordance with claim 1, wherein the locking bolt (30) is exclusively marked.

8. Loop closure in accordance with claim 7, wherein the marking is engraved by means of a laser beam.

* * * * *

UNITED STATES PATENT AND TRADEMARK OFFICE

CERTIFICATE OF CORRECTION

PATENT NO. : 7,690,091 B2
APPLICATION NO. : 11/598389
DATED : April 6, 2010
INVENTOR(S) : Stobbe It is certified that error appears in the above-identified patent and that said Letters Patent is hereby corrected as shown below:

Cover page, Item [73], please change "Baringhausen" to correctly read: --Barsinghausen--.

Signed and Sealed this

Eighteenth Day of May, 2010

David J. Kappos

David J. Kappos
*Director of the United States Patent and Trademark Office*